US012300099B2

(12) United States Patent
Sudou

(10) Patent No.: US 12,300,099 B2
(45) Date of Patent: May 13, 2025

(54) DISPLAY CONTROL OF A TRAFFIC LAMP FOR A VEHICLE VISUALLY BLOCKED BY ANOTHER VEHICLE

(71) Applicant: NEC Corporation, Tokyo (JP)

(72) Inventor: Hiroyasu Sudou, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/909,809

(22) PCT Filed: Mar. 31, 2020

(86) PCT No.: PCT/JP2020/014914
§ 371 (c)(1),
(2) Date: Sep. 7, 2022

(87) PCT Pub. No.: WO2021/199331
PCT Pub. Date: Oct. 7, 2021

(65) Prior Publication Data
US 2024/0242602 A1 Jul. 18, 2024

(51) Int. Cl.
*G08G 1/07* (2006.01)
*G08G 1/01* (2006.01)

(52) U.S. Cl.
CPC ................. *G08G 1/07* (2013.01); *G08G 1/01* (2013.01)

(58) Field of Classification Search
CPC ................................... G08G 1/07; G08G 1/01
See application file for complete search history.

(56) References Cited

U.S. PATENT DOCUMENTS

2014/0055286 A1* 2/2014 Allen ....................... G08G 1/04
340/923

FOREIGN PATENT DOCUMENTS

| | | | | |
|---|---|---|---|---|
| JP | S57-36399 | A | | 2/1982 |
| JP | 2001-134892 | A | | 5/2001 |
| JP | 2004-258867 | A | | 9/2004 |
| JP | 2013190898 | A | * | 9/2013 |
| JP | 2015-106395 | A | | 6/2015 |
| JP | 2015166974 | A | * | 9/2015 |
| JP | 2016085651 | A | * | 5/2016 |
| JP | 2017073019 | A | * | 4/2017 |
| JP | 2017-208141 | A | | 11/2017 |

OTHER PUBLICATIONS

International Search Report for PCT Application No. PCT/JP2020/014914, mailed on Jul. 7, 2020.
English translation of Written opinion for PCT Application No. PCT/JP2020/014914, mailed on Jul. 7, 2020.

* cited by examiner

*Primary Examiner* — Adnan Aziz
*Assistant Examiner* — James E Munion
(74) *Attorney, Agent, or Firm* — Sughrue Mion, PLLC

(57) ABSTRACT

A signal control device is provided with: an information acquisition unit which acquires first sensor data from a sensor that is capable of detecting a vehicle present in a display direction of a lamp; a determination unit which determines, on the basis of the first sensor data, whether or not there is a following vehicle behind the vehicle detected by the sensor, the following vehicle being unable to see the display state of the lamp due to the presence of the preceding vehicle; and a lamp control unit which, in the case when it is determined that there is a following vehicle unable to see the display state of the lamp, changes the display pattern of the lamp so as to enable the following vehicle to negotiate the intersection.

10 Claims, 11 Drawing Sheets

Fig. 8

| VEHICLE ID | LOCATION | TRANSMISSION DESTINATION |
| --- | --- | --- |
| AAAA | N: 35.XXXXXXX<br>E: 139.XXXXXXX | IN-VEHICLE TERMINAL ID: 090XXXXXXX |
| : | : | : |

DISPLAY CONTROL OF A TRAFFIC LAMP FOR A VEHICLE VISUALLY BLOCKED BY ANOTHER VEHICLE

This application is a National Stage Entry of PCT/JP2020/014914 filed on Mar. 31, 2020, the contents of all of which are incorporated herein by reference, in their entirety.

TECHNICAL FIELD

The present disclosure relates to a signal control device, a signal control method, and a program.

BACKGROUND ART

The installation position of the lamp of the traffic signal (hereinafter, also simply referred to as "traffic signal") is determined in consideration of visibility from the vehicle, not hindering traveling of the vehicle, and other situations of individual intersections. Specifically, the installation position is defined in traffic signal construction specifications of each prefecture, and the lowest part of the lamp is often installed so as to be 5.0 to 5.6 m from the ground.

In addition, in recent years, LEDs (Light Emitting Diodes) have been increasingly used for lamps, and lamps having a diameter of 250 mm have been replaced with smaller lamps having a diameter of 300 mm. Therefore, the entire traffic signal is downsized.

On the other hand, the height of the line of sight (eye point) of the driver who is driving the vehicle is about 1.2 m from the ground in the case of a passenger car, and about 2 m in many cases of trucks and buses. For this reason, when directly behind a large vehicle, a vehicle body of the large vehicle often makes the lamp of a traffic signal invisible from a following vehicle.

From such a viewpoint, PTL 1 discloses a signal information presenting device capable of detecting signal information indicated by a traffic signal from an image captured using a side mirror or a camera installed on a roof and displaying the signal information on an in-vehicle terminal.

PTL 2 discloses a crosswalk signal system having a function of extending a green display time of a pedestrian signal when a child or a person in a wheelchair is detected (see paragraph 0028).

CITATION LIST

Patent Literature

[PTL 1] JP 2015-106395 A
[PTL 2] JP 2017-208141 A

SUMMARY OF INVENTION

Technical Problem

The following analysis is given by the inventor. Since the signal information presenting device described in PTL 1 or the like is configured to capture an image by a side mirror or a camera installed on a roof, there is a case where the display status of the lamp of the traffic signal cannot be captured depending on the size of the preceding vehicle and the positional relationship with the preceding vehicle. For example, in the case of a passenger car, even if a camera is installed on the roof, the height of the camera is at most about 1.5 m, and in a case where the preceding vehicle is a large bus or a truck, it is impossible to capture an image of a traffic signal in front of the vehicle, and correct signal information cannot be displayed also on the in-vehicle terminal. In such a situation, since the driver of the passenger car cannot check the color of the lamp of the traffic signal, the driver cannot notice even if the signal is likely to change to red, and may enter the intersection following the preceding vehicle. Thereafter, when a large bus or a truck makes a right or left turn, the driver notices that the signal has turned red. However, depending on the position of the passenger car, the driver may be left at a dangerous position in the intersection, or may make an unreasonable right or left turn in order to avoid such a situation.

The signal system for a crosswalk of PTL 2 extends for a person whose walking speed is slow and it takes time to cross the crosswalk, and cannot solve the above problem.

An object of the present disclosure is to provide a signal control device that performs display control of a lamp in consideration of a vehicle in which a forward view of a preceding vehicle is blocked as described above.

Solution to Problem

According to a first aspect, there is provided a signal control device including: an information acquisition unit configured to acquire first sensor data from a sensor capable of detecting a vehicle present in a display direction of a lamp; a determination unit configured to determine, based on the first sensor data, whether there is a following vehicle behind the vehicle captured by the sensor, the following vehicle being incapable of visually recognizing a display status of the lamp due to presence of a preceding vehicle; and a lamp control unit configured to change a display pattern of the lamp in a such way that the following vehicle can pass through an intersection when it is determined that there is a following vehicle that is incapable of visually recognizing a display status of the lamp.

According to a second aspect, there is provided a signal control method including: acquiring first sensor data from a sensor capable of detecting a vehicle present in a display direction of a lamp; determining, based on the first sensor data, whether there is a following vehicle behind the vehicle captured by the sensor, the following vehicle being incapable of visually recognizing a display status of the lamp due to presence of a preceding vehicle; and when it is determined that there is a following vehicle that is incapable of visually recognizing a display status of the lamp, changing a display pattern of the lamp in such a way that the following vehicle can pass through an intersection. The method is linked to a specific machine, a signal control device, which controls the lamp of a traffic signal.

According to a third aspect, there is provided a computer program for achieving the function of the signal control device described above is provided. This program can be recorded in a computer-readable (non-transitory) storage medium. That is, the present disclosure can also be embodied as a computer program product.

Advantageous Effects of Invention

According to the present disclosure, it is possible to perform display control of a lamp in consideration of a vehicle in which a forward view of a preceding vehicle is blocked.

BRIEF DESCRIPTION OF DRAWINGS

FIG. 8 is a diagram illustrating an example of vehicle information managed by a location management center according to the third example embodiment of the present disclosure.

EXAMPLE EMBODIMENT

Figure 1:
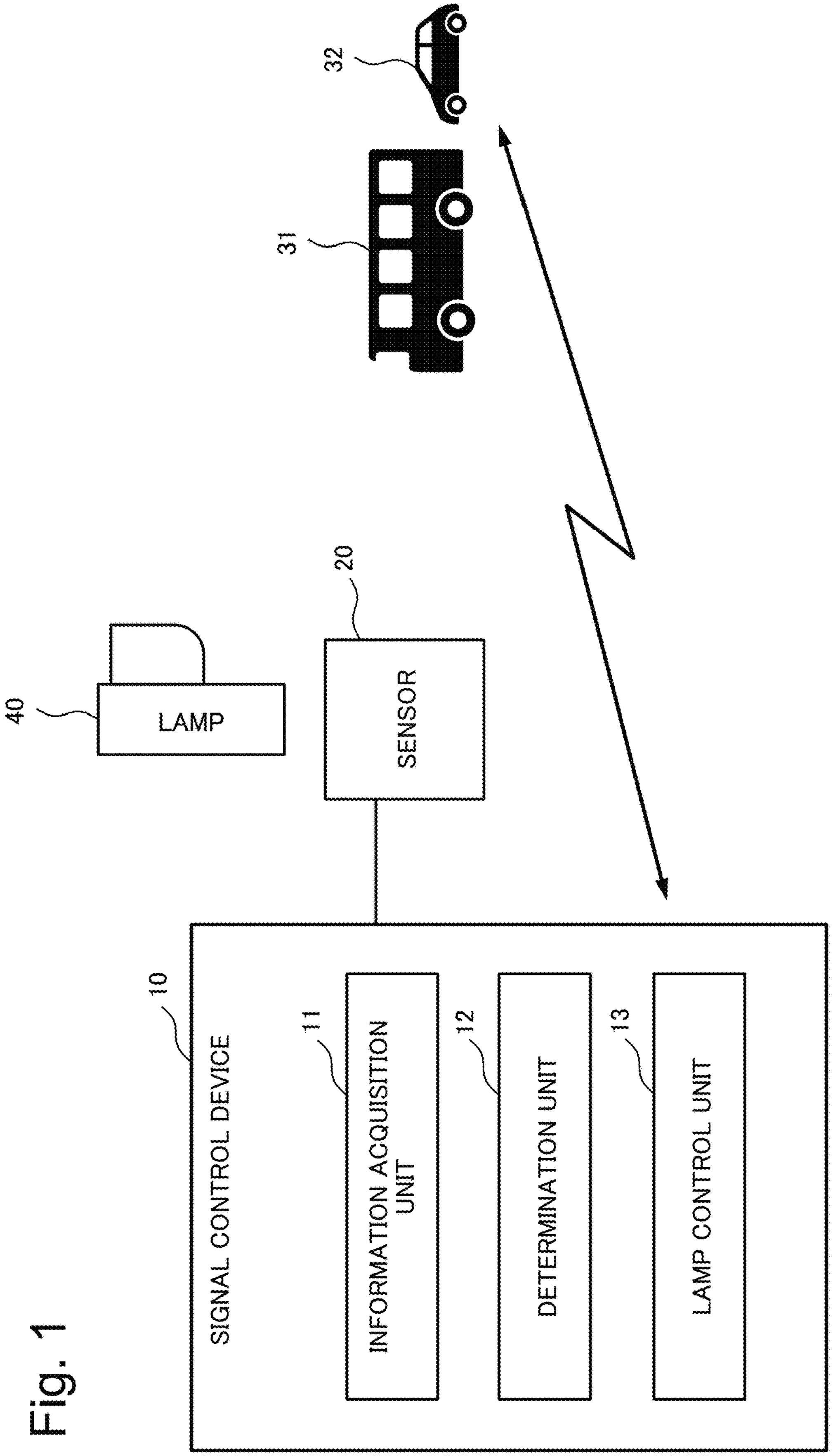
FIG. 1 is a diagram illustrating a configuration of one example embodiment of the present disclosure.

First, an outline of an example embodiment of the present invention will be described with reference to the drawings. The reference numerals in the drawings attached to this outline are attached to each element for convenience as an example for assisting understanding, and are not intended to limit the present disclosure to the illustrated aspects. Connection lines between blocks in the drawings and the like referred to in the following description include both bidirectional and unidirectional. The unidirectional arrow schematically indicates a flow of a main signal (data), and does not exclude bidirectionality. Although there are ports and interfaces at connection points of input and output of each block in the drawing, they are not illustrated. In the following description, "A and/or B" is used to mean at least one of A and B.

In one example embodiment of the present disclosure, as illustrated in FIG. 1, the present disclosure can be achieved by a signal control device 10 including an information acquisition unit 11, a determination unit 12, and a lamp control unit 13.

More specifically, the information acquisition unit 11 acquires first sensor data from a sensor 20 capable of detecting a vehicle existing in the display direction (right direction in FIG. 1) of a lamp 40. Then, based on the first sensor data, the determination unit 12 determines whether there is a following vehicle behind a vehicle 31 captured by the sensor 20, a following vehicle 32 being incapable of visually recognizing the display status of the lamp 40 due to the presence of a preceding vehicle.

Then, when determining that there is the following vehicle 32 that cannot visually recognize the display status of the lamp 40, the lamp control unit 13 changes the display pattern of the lamp 40 in such a way that the following vehicle 32 can pass through the intersection.

According to the signal control device 10 operating as described above, it is possible to grasp that there is the following vehicle 32 that cannot visually recognize the display status of the lamp 40 due to the presence of the preceding vehicle, and control the traffic signal in such a way that the following vehicle 32 can pass through the intersection.

With this configuration, it is possible to give time allowance to the following vehicle 32 to enter the intersection or turn right or left, thereby preventing an accident or a stall in the intersection.

Various forms are conceivable as a form of changing the display pattern of the lamp 40. For example, in addition to a form in which the display time of the display color (green, yellow, right turn, straight, left turn, yellow blinking, etc.) other than red in the current lamp 40 is simply extended for a certain time, a form in which the display time of the lighting color displayed in the transition process to the red signal such as yellow is extended is considered. At that time, the display time may not be uniformly extended, but the display pattern of the lamp may be changed only when the display color of the lamp turns red after a predetermined time elapses.

Furthermore, in a case where the number of following vehicles 32 and the situation of the road in the traveling direction of the following vehicle 32 are known from the first sensor data or the like from the sensor 20, the display pattern of the lamp 40 may be changed. For example, when the road in the traveling direction of the following vehicle 32 is congested, there is a high possibility of being left in the intersection even if the green light time is extended. In this case, it is also conceivable not to extend the display time. Furthermore, for example, in a case where only a road in a straight traveling direction is congested, it is conceivable to display right turn and/or left turn instead of displaying a green light, and extend the display time.

The extension of the display time of a certain signal color may change the display cycle of the signal. In order not to change the display cycle of the signal, it is conceivable to shorten the display time of another color by the extended display time of the signal color or adjust the display time in the next cycle. Furthermore, in a case where the signal control device 10 is a target of centralized control from a predetermined control center, it is necessary to maintain cooperation with other traffic signals. In this case, it is also possible to adopt a configuration in which the signal control device 10 inquires of a predetermined control center whether the display time of the lamp may be extended, and changes the display pattern of the lamp when permission is given from the predetermined control center.

First Example Embodiment

Figure 2:
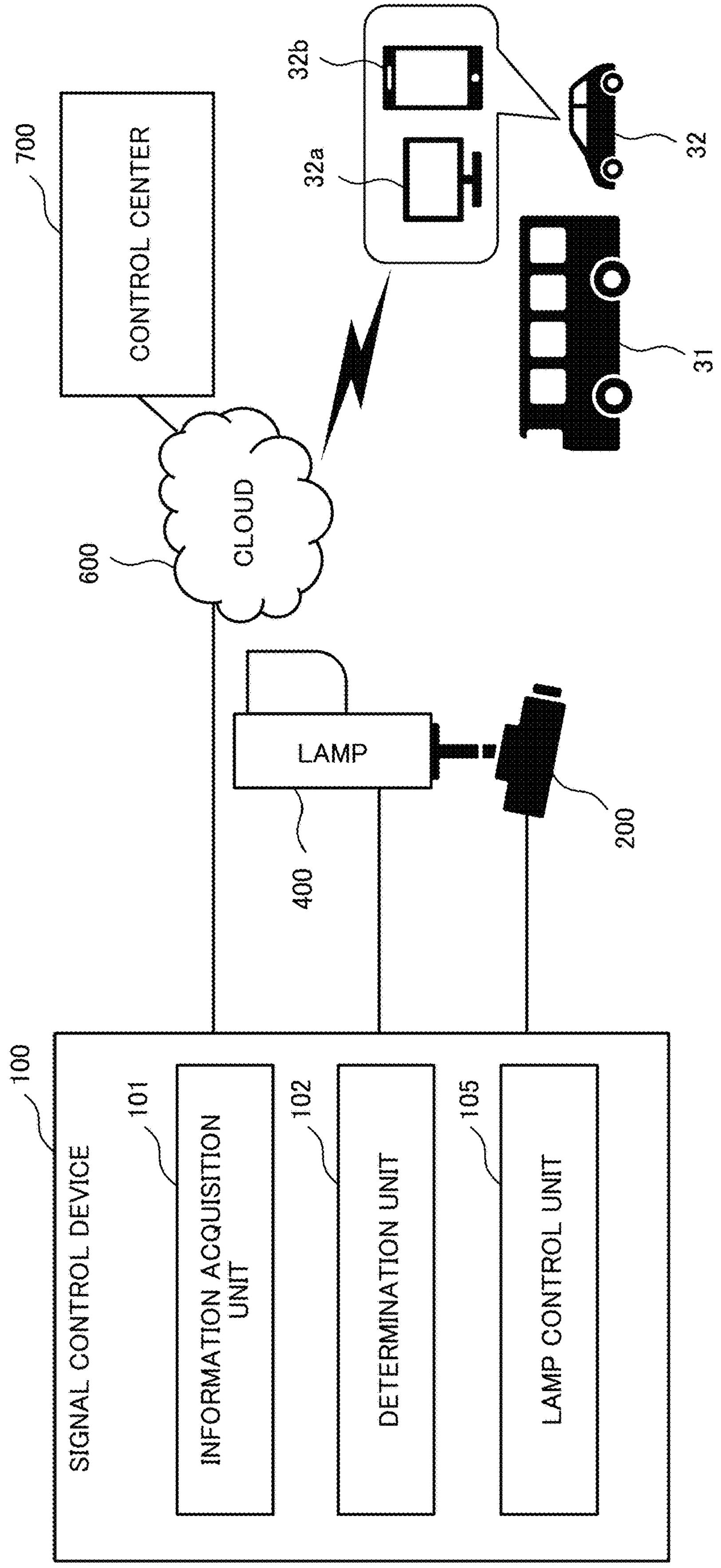
FIG. 2 is a diagram illustrating a configuration of a signal control device according to a first example embodiment of the present disclosure.

Next, a first example embodiment using a camera as a sensor will be described in detail with reference to the drawings. FIG. 2 is a diagram illustrating a configuration of the signal control device according to the first example embodiment of the present disclosure. Referring to FIG. 2, a configuration in which the signal control device 100, a control center 700, and the vehicles 31 and 32 are communicably connected to each other via a cloud (infrastructure) 600 is illustrated.

The signal control device 100 includes an information acquisition unit 101, a determination unit 102, and a lamp control unit 105 that controls display of the lamp of a lamp 400.

Further, the signal control device 100 is connected to a camera 200 installed in such a way as to be capable of capturing an image in the same direction as the display direction of the lamp 400 of the traffic signal.

Next, each unit of the signal control device 100 will be described. The information acquisition unit 101 acquires a captured image as first sensor data from the camera 200 installed in the vicinity of the lamp 400 in such a way that the lamp 400 can be captured in the display direction.

Based on the captured image acquired by the information acquisition unit 101, the determination unit 102 determines whether there is a following vehicle behind the vehicle 31 captured by the camera 200, the following vehicle 32 being incapable of visually recognizing the display status of the lamp 400 due to the presence of the preceding vehicle.

Figure 3:
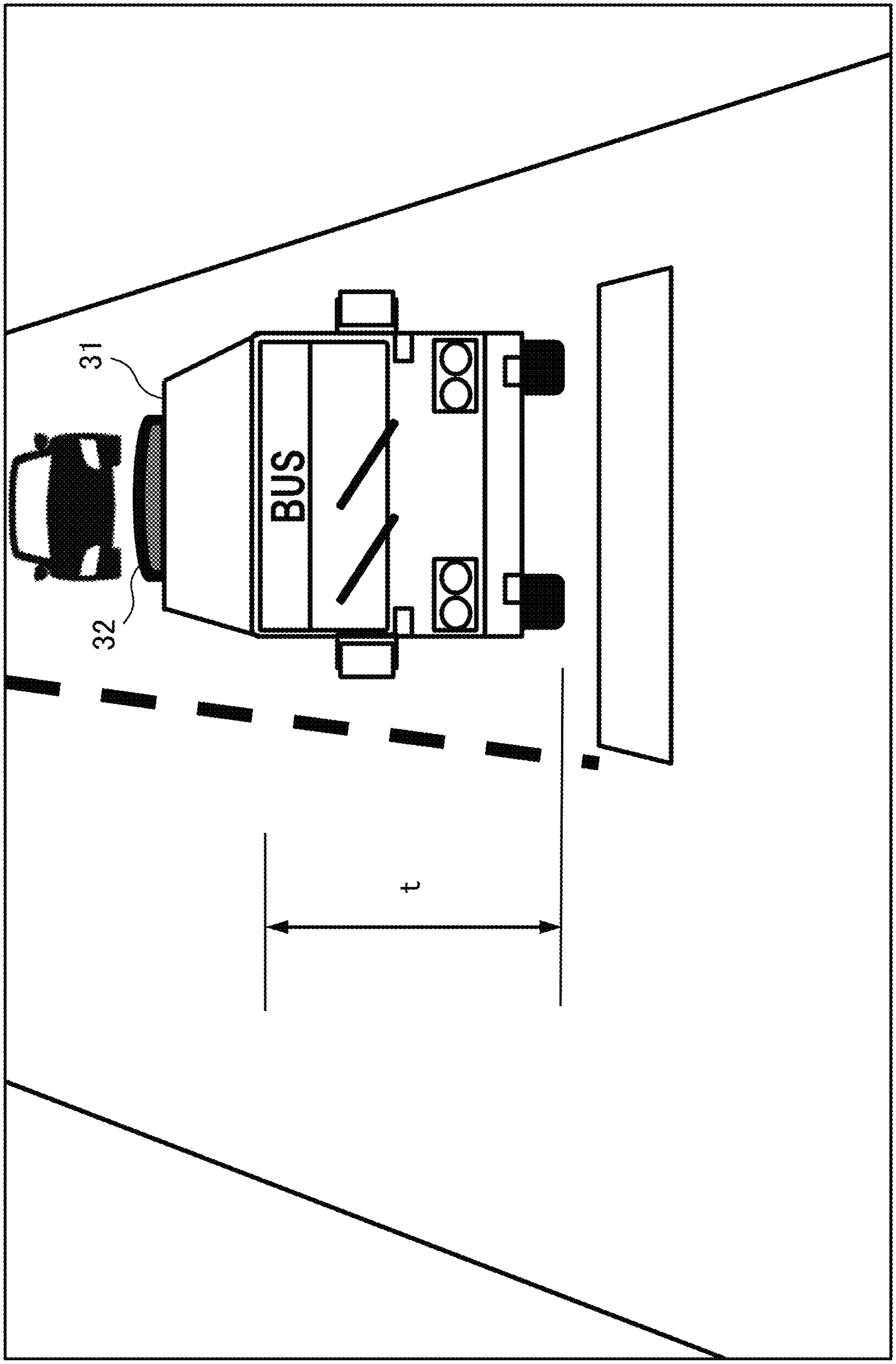
FIG. 3 is a diagram illustrating an example of an intersection image input to the signal control device according to the first example embodiment of the present disclosure.

FIG. 3 is a diagram illustrating an example of an intersection image input to the signal control device 100 according to the first example embodiment of the present disclosure. In the example of FIG. 3, since the vehicle 31 stopping before the intersection is a large vehicle (bus), the following vehicle 32 is hidden behind the large vehicle, and only the roof portion is shown. As described above, since the camera 200 is provided in the vicinity of the lamp 400 and in the display direction thereof, it is estimated that the display status of the traffic signal cannot be visually recognized from the following vehicle 32 under such a situation. In this case, determination unit 102 determines that following vehicle 32 is present behind the vehicle 31. Whether the vehicle 31 is a large vehicle (bus) can be determined by a distance between the camera 200 and the vehicle, a height (vehicle height) t of the vehicle shown in the image, and the like.

Figure 4:
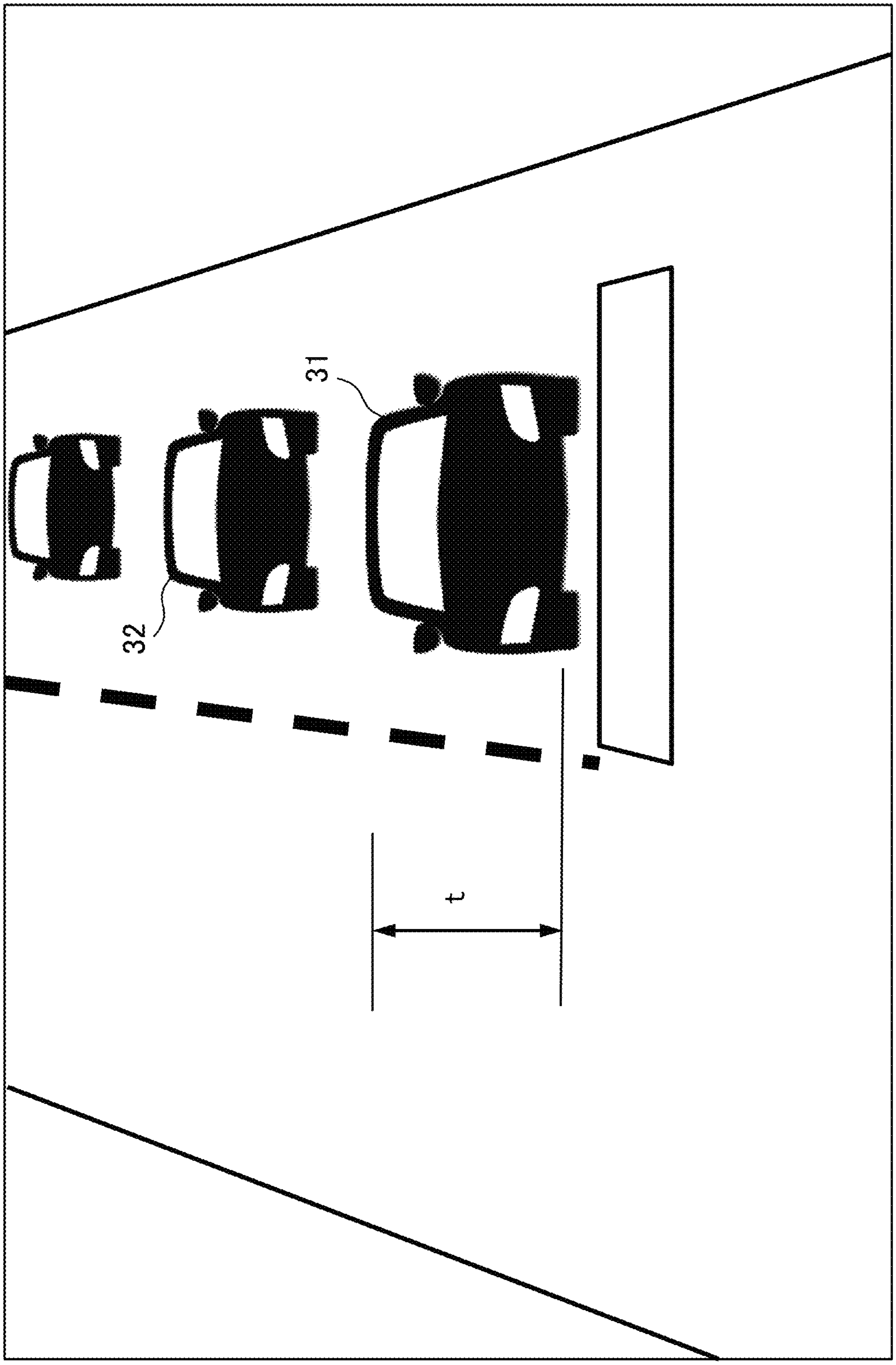
FIG. 4 is a diagram illustrating another example of the intersection image input to the signal control device according to the first example embodiment of the present disclosure.

FIG. 4 is a diagram illustrating another example of the intersection image input to the signal control device 100 according to the first example embodiment of the present disclosure. In the example of FIG. 4, since the vehicle 31 stopping before the intersection is a passenger car, the following vehicle 32 is not hidden behind the passenger car. Under such circumstances, it is inferred that the driver of the following vehicle 32 can visually recognize the display status of the traffic signal. In this case, the determination unit 102 determines that there is no vehicle hidden behind the vehicle 31.

When it is determined that the following vehicle 32 is present behind the vehicle 31 and it is a predetermined time before the lighting color of the lamp 400 changes to red, the lamp control unit 105 changes the display pattern of the lamp 400 in such a way that the following vehicle 32 can pass through the intersection. In the following example embodiment, it is assumed that the traffic signal is provided with the three color lamps 400 of green, yellow, and red, and the signal control device 100 gives the following vehicle 32 a time to pass through the intersection by extending the yellow display time among them.

The control center 700 centrally controls the signal control devices of traffic signals at various places including the signal control device 100.

Figure 5:
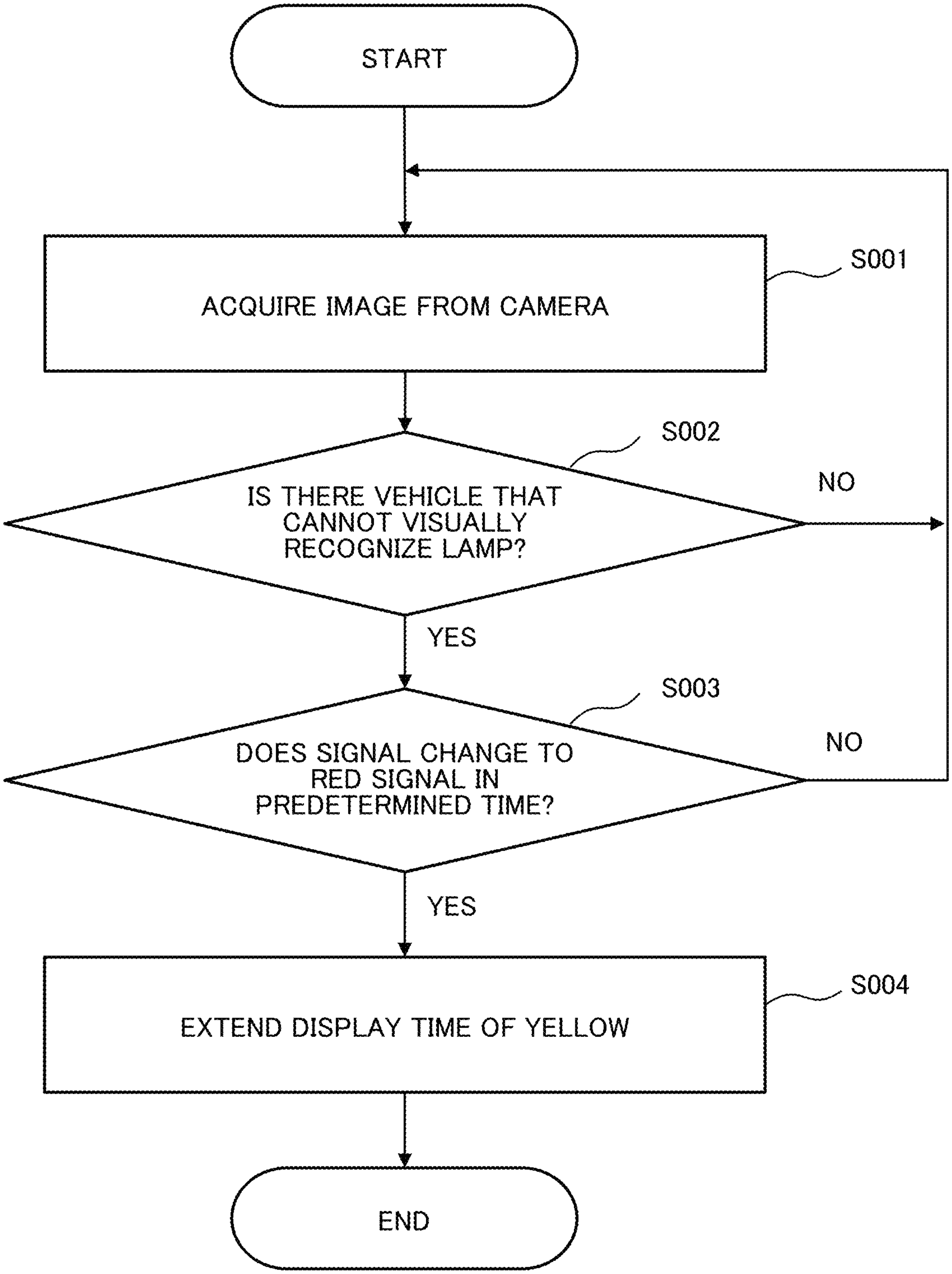
FIG. 5 is a flowchart for explaining the operation of the first example embodiment of the present disclosure.

Next, the operation of the first example embodiment of the present disclosure will be described in detail with reference to the drawings. FIG. 5 is a flowchart for explaining the operation of the first example embodiment of the present disclosure. Referring to FIG. 5, the signal control device 100 acquires captured images in the display direction of the lamp 400 from the camera 200 at predetermined time intervals (Step S001).

Next, the signal control device 100 determines whether there is a vehicle that cannot visually recognize the display status of the lamp 400 due to the presence of the preceding vehicle based on the acquired image (Step S002). In the present example embodiment, a description will be given on the assumption that, when a large vehicle is captured within the image capturing range of the camera 200, it is determined that there is a vehicle that cannot visually recognize the display status of the lamp 400 due to the presence of a preceding vehicle.

In a case where the direction of the camera 200 is fixed, whether the vehicle captured in the captured image is a large vehicle can be determined on the basis of the size of the image of the vehicle in the captured image. At this time, in order to avoid erroneous determination, the distance between the camera 200 and the vehicle may be calculated. The distance between the camera 200 and the vehicle can be obtained from the position of the front end portion (bumpers, headlights, front wheels, etc.) of the vehicle in the captured image. For example, as shown in FIG. 4, when the vehicle 31 is shown on the upper side of the stop line in the image, the actual distance between the vehicle 31 and the stop line (camera 200) can be calculated according to the degree of separation between the stop line in the image and the front end of the vehicle. In a case where it is determined that no large vehicle is imaged within the image capturing range of the camera 200, the signal control device 100 returns to Step S001 and continues monitoring of the captured image (NO in Step S002).

When it is determined that there is a vehicle that cannot visually recognize the display status of the lamp 400 due to the presence of the preceding vehicle (YES in Step S002), the signal control device 100 next determines whether the display of the lamp 400 changes to red within a predetermined time (Step S003). Here, in a case where it is determined that the display of the lamp 400 does not change to red within the predetermined time, it is not necessary to extend the display time of the yellow signal, and thus, the process returns to Step S001.

On the other hand, when determining in Step S003 that the display of the lamp 400 changes to red within the predetermined time, the signal control device 100 extends the display time of the yellow signal (Step S004). The extension of the display time of the yellow light is an extension of the display time of the red signal when viewed from the signal in the intersecting direction of the intersection. As a result, entry of the vehicle from the road in the intersecting direction of the intersection is suppressed.

As described above, according to the present example embodiment, it is possible to give time allowance to the following vehicle 32 to enter an intersection or turn right or left.

In the above-described example embodiment, the signal control device 100 has been described as extending the display time of the yellow signal, but various modifications are conceivable for the signal color for extending the display time depending on the specifications of the traffic signal installed at the intersection. For example, in a case where the traffic signal to be controlled by the signal control device 100 performs lighting indicating progress in a specific direction by red and an arrow after the yellow signal, and then has a display cycle in which the traffic signal is switched to the red signal, a mode in which the display time of the red and the arrow is extended can also be adopted. As a result, for example, it is possible to give time allowance to make a right turn to the following vehicle 23 that cannot recognize that the vehicle is switching to a red signal because the following vehicle is behind a large vehicle in a right turn lane.

In the present example embodiment, the signal control device 100 may report to the control center 700 that the display time of the yellow signal has been extended. In this way, the control center 700 can also reflect the information received from the signal control device 100 in the system control.

Second Example Embodiment

Figure 6:
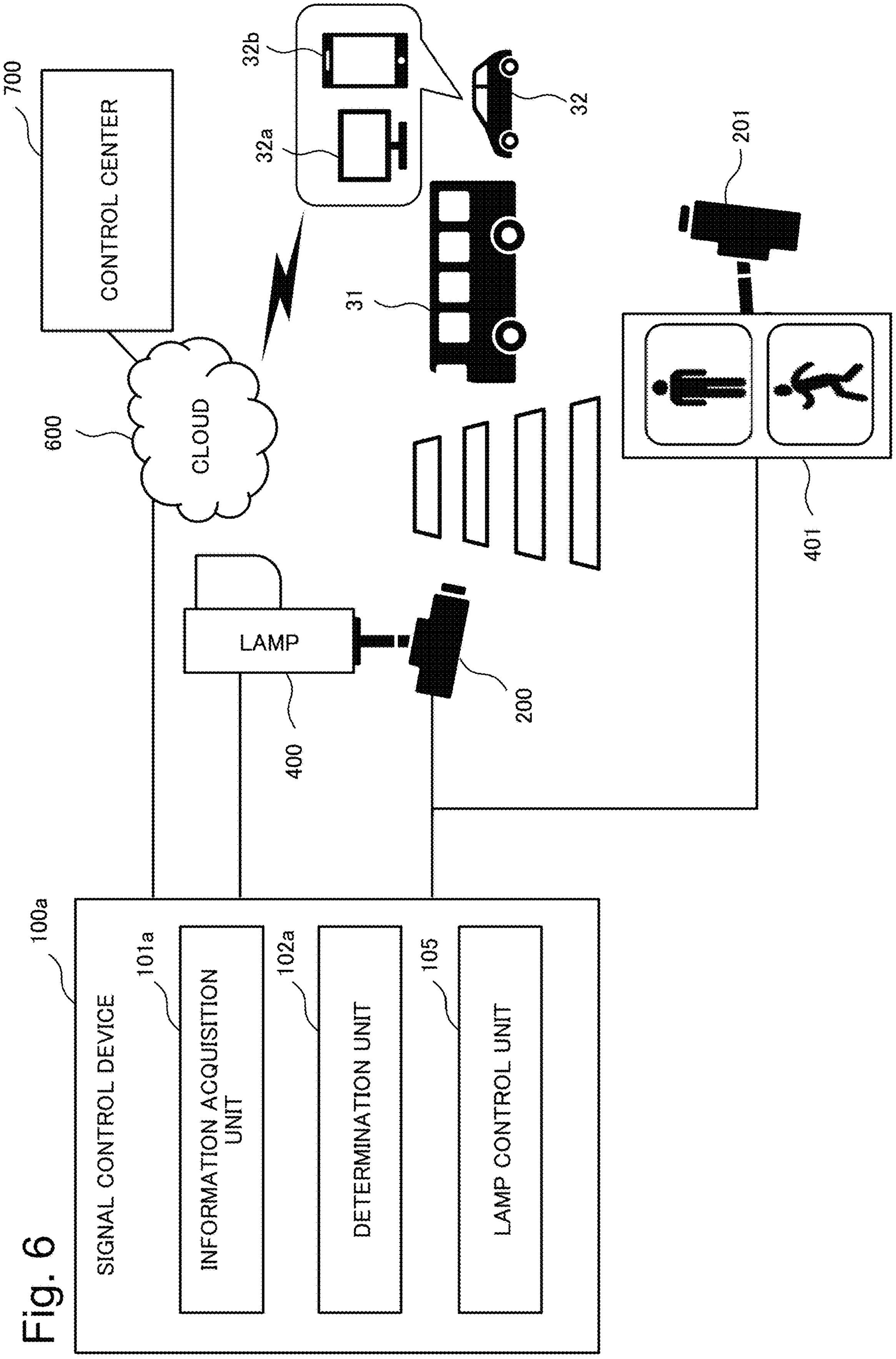
FIG. 6 is a diagram illustrating a configuration of a signal control device according to a second example embodiment of the present disclosure.

Next, a second example embodiment will be described in detail with reference to the drawings in which a camera disposed at a position on a side of a display direction of a lamp is used together to check a following vehicle. FIG. 6 is a diagram illustrating a configuration of a signal control device according to the second example embodiment of the present disclosure. A difference from the first example embodiment illustrated in FIG. 2 is that a camera 201 provided alongside a pedestrian signal 401 on a side of an intersection is connected to a signal control device 100*a* as a second sensor. Since the other configurations are basically similar to those of the first example embodiment, differences thereof will be mainly described below.

The information acquisition unit 101*a* acquires the captured image as the first sensor data from the camera 200, and acquires the captured image as the second sensor data from the camera 201 that is disposed in front of the display direction side of the lamp 400 at the intersection and captures the image from the side.

Based on each captured image acquired by the information acquisition unit 101*a*, a determination unit 102*a* determines whether there is a following vehicle behind the vehicle 31 captured by the camera 200, the following vehicle 32 being incapable of visually recognizing the display status of the lamp 400 due to the presence of the preceding vehicle. The second example embodiment is different from the first example embodiment in that the determination unit 102*a* checks whether the following vehicle 32 is present behind the vehicle 31 on the basis of the captured image from the camera 201.

According to the present example embodiment, when there is a large vehicle but there is no following vehicle 32, it is possible to suppress a change in the display pattern of the lamp 400. As a result, it is possible to suppress an unnecessary change in the display cycle of the traffic signal.

Third Example Embodiment

Figure 7:
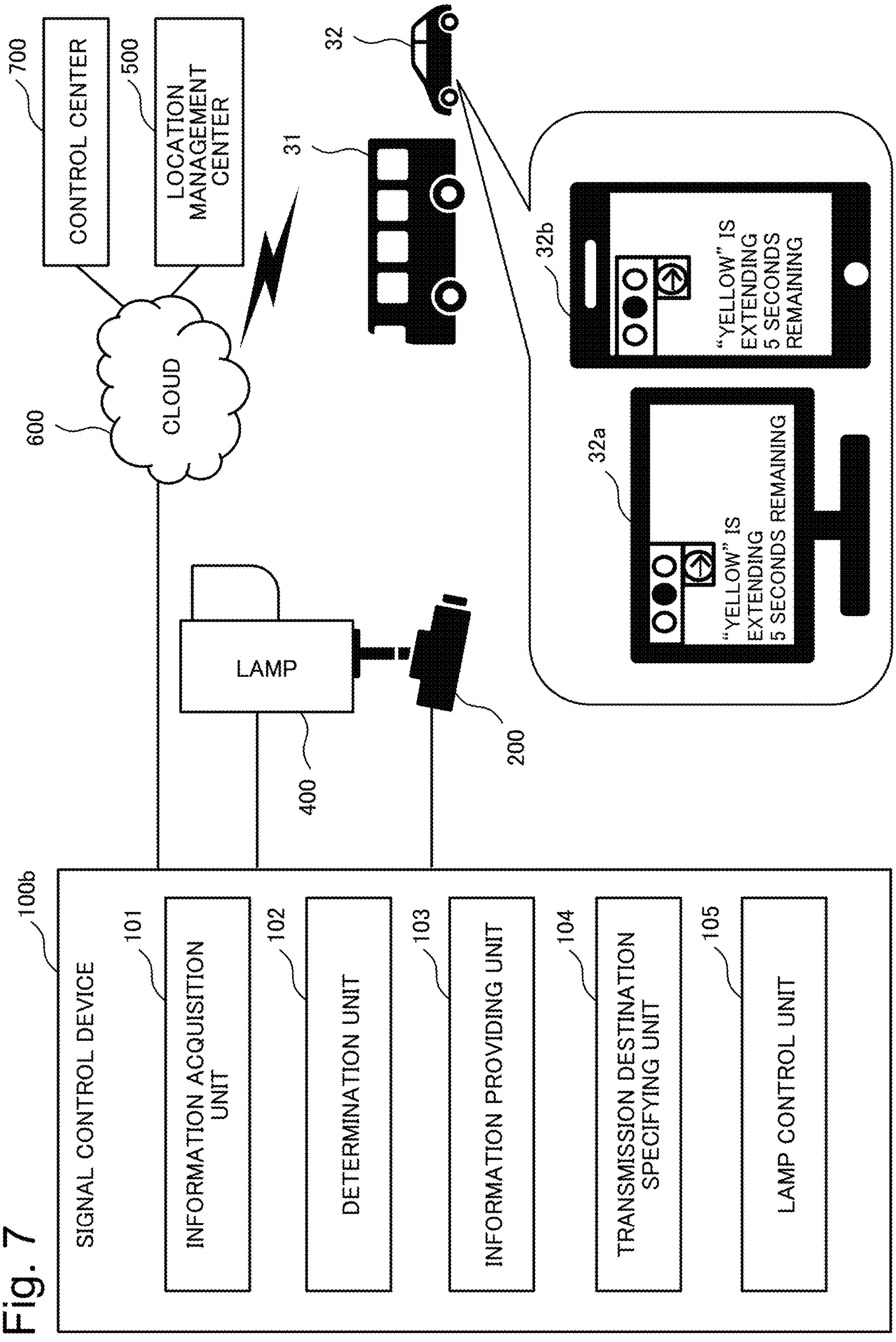
FIG. 7 is a diagram illustrating a configuration of a signal control device according to a third example embodiment of the present disclosure.

Next, a third example embodiment configured to transmit signal information for notifying a following vehicle of a display status of a lamp in addition to changing a display pattern of the lamp will be described in detail with reference to the drawings. FIG. 7 is a diagram illustrating a configuration of a signal control device according to the third example embodiment of the present disclosure. A difference from the first example embodiment illustrated in FIG. 2 is that an information providing unit 103 and a transmission destination specifying unit 104 are added to a signal control device 100*b*, and a location management center 500 is added on a cloud (infrastructure) 600 side. Since the other configurations are basically similar to those of the first example embodiment, differences thereof will be mainly described below.

When determining that the following vehicle 32 is present behind the vehicle 31, the transmission destination specifying unit 104 specifies a transmission destination when transmitting the signal information to the following vehicle 32. Specifically, the transmission destination specifying unit 104 inquires of the location management center 500 on the cloud (infrastructure) 600 about information on the vehicle located at the corresponding location. The transmission destination specifying unit 104 transmits the information regarding the information transmission destination of the following vehicle 32 obtained as a result of the inquiry to the information providing unit 103.

When determining that the following vehicle 32 is present behind the vehicle 31, the information providing unit 103 transmits signal information for notifying the transmission destination obtained from the transmission destination specifying unit 104 of the display status of the lamp 400. This signal information can be created on the basis of display status information of the lamp obtained from the lamp control unit 105.

FIG. 8 is a diagram illustrating an example of vehicle information managed by the location management center according to the first example embodiment of the present disclosure. Referring to FIG. 8, the vehicle information in which a vehicle ID, a vehicle position, and a transmission destination are associated with each other is illustrated. This vehicle information is updated in real time upon receipt of a report from the vehicle in accordance with the movement of the vehicle. For example, by designating a position of the vehicle 31 hidden behind the vehicle 32, it is possible to specify a transmission destination of data for the following vehicle 32. By using this transmission destination, the signal information can be transmitted to the following vehicle 32. In the present example embodiment, it is assumed that absolute coordinates (latitude and longitude) are used as the position of the vehicle, but the expression mode of the position in the location management center is not limited thereto. For example, cell information of a base station in which the vehicle is located can be used. In this case, the signal control device designates the base station cell before the traffic signal controlled by the signal control device itself and inquires about the vehicle.

As a transmission mode of the signal information, a form of transfer using PS-LTE (Public Safety LTE) or a commercial mobile communication network can also be adopted. Furthermore, as another transmission mode of the signal information, a mode in which the signal information is transmitted from the signal control device to the following vehicle 32 using a communication device on the road side used in road-to-vehicle communication can also be adopted. Furthermore, as another transmission mode of the signal information, a mode in which the signal information transmitted from the signal control device to the vehicle 31 is transferred to the following vehicle 32 using vehicle-to-vehicle communication can also be adopted.

The location management center 500 manages the vehicle information illustrated in FIG. 8, determines a corresponding vehicle in response to an inquiry about information of a vehicle whose location or range is designated from the outside, and responds with the vehicle information.

Figure 9:
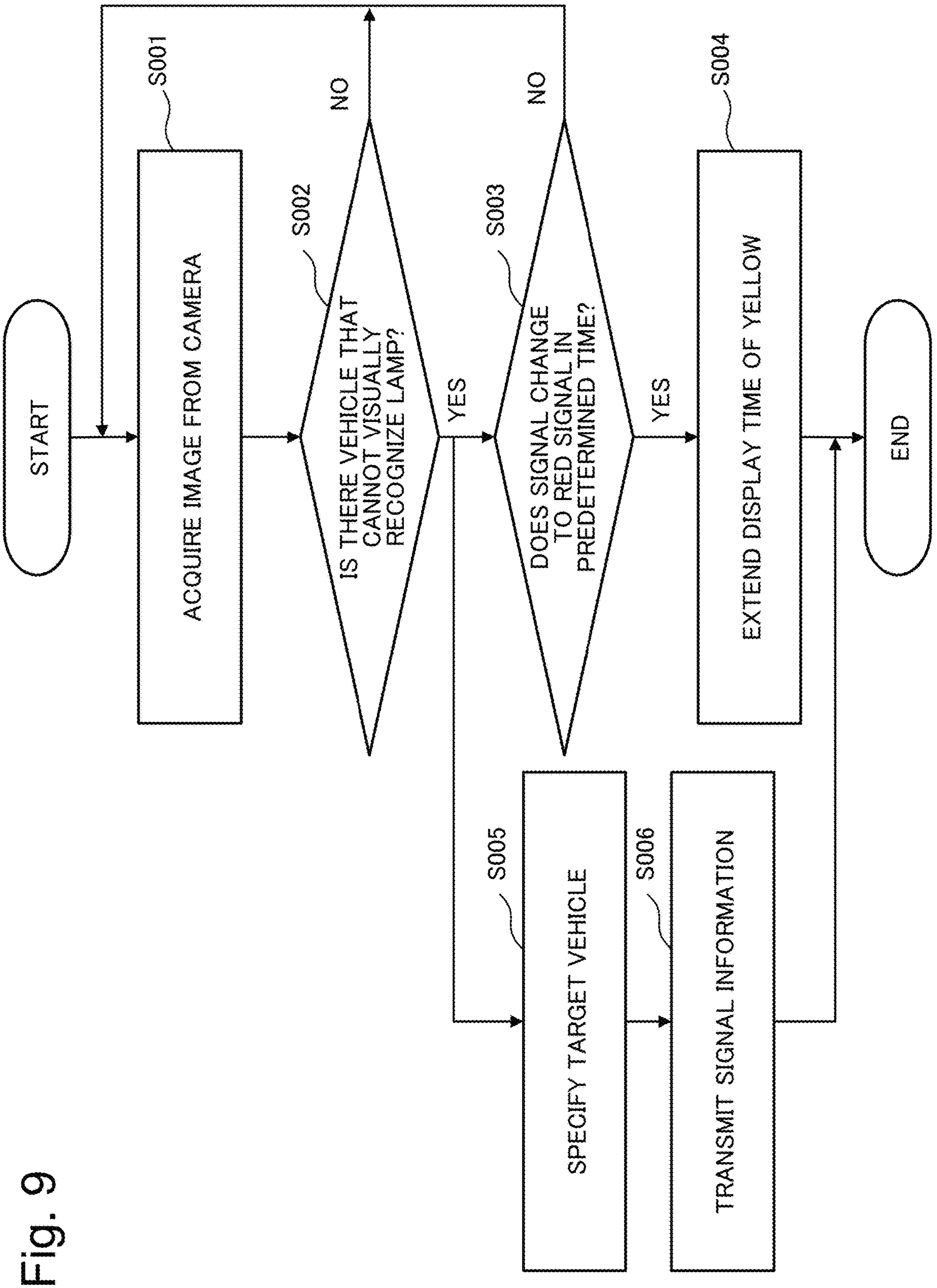
FIG. 9 is a flowchart for explaining the operation of the third example embodiment of the present disclosure.

Next, the operation of the present example embodiment will be described in detail with reference to the drawings. FIG. 9 is a flowchart for explaining the operation of the third example embodiment of the present disclosure. Since the basic operation of the present example embodiment is similar to that of the first example embodiment illustrated in FIG. 5, differences thereof will be described below.

When it is determined in Step S002 of FIG. 9 that there is a vehicle that cannot visually recognize the display status of the lamp 400 due to the presence of the preceding vehicle, the signal control device 100*b* specifies the transmission destination of the signal information, that is, an in-vehicle terminal 32*a* of the following vehicle 32 (Step S005). The following vehicle can be specified by the signal control device 100*b* designating a range in which the following vehicle 32 is estimated to be located and inquiring the location management center 500 about vehicle information (see FIG. 8) located in the range. The range of the inquiry can be, for example, a position (for example, 4 to 10 m behind the vehicle 31, etc.) in a direction away from the traffic signal in the display direction of the lamp on the basis of the estimated position of the vehicle (for example, the vehicle 31 of FIG. 4) shown in the captured image. When a plurality of vehicles are specified as the specific result, all the vehicles may be set as the target vehicle, or only the leading vehicle (that is, a vehicle immediately behind a large vehicle) may be set as the target vehicle.

Next, the signal control device 100*b* transmits signal information for notifying the transmission destination specified in Step S005 of the display status of the lamp 400 (Step S006). For example, when the display status of the lamp that should be originally visible in the target vehicle is the yellow signal, the signal control device 100*b* transmits signal information indicating that the signal in the traveling direction is the yellow signal to the transmission destination specified in Step S005. As a result, the following vehicle 32 specified as the transmission destination can determine whether to enter the intersection or stop on the basis of the actual signal color.

The signal information described above is not limited only to the display status of the lamp 400, and various types of information can be added. For example, the signal control device 100*b* may transmit a message indicating "extending" or a timing at which the display status of the lamp 400 is switched together with the display status of the lamp 400 on the basis of the information acquired from the lamp control unit 105. For example, by notifying that the yellow light is being extended and the time until the light is switched to the red signal (for example, "Remaining 5 seconds" in FIG. 7), it is possible to give a ground for determining whether to enter the intersection to the following vehicle 32.

For example, the signal control device 100 may acquire the display status of the lamp of the traffic signal (adjacent traffic signal) one ahead and the traffic jam situation therebetween together with the display status of the lamp, and notify the following vehicle 32 of the data.

As described above, according to the present example embodiment, it is possible to notify the vehicle of the display status of the lamp of the traffic signal and prevent the vehicle from forcibly entering the intersection, which causes the occurrence of an accident or a traffic jam, in addition to giving a time allowance for entering the intersection or turning right or left to the vehicle in which the forward view of the preceding vehicle is blocked.

In the above-described example embodiment, the example of transmitting the signal information to the in-vehicle terminal 32*a* has been described. However, in a case where the information of a mobile terminal 32*b* of the driver or the passenger is set as the contact address of the vehicle information illustrated in FIG. 8, the signal information can also be transmitted to the smartphone of the driver or the passenger.

Fourth Example Embodiment

Figure 10:
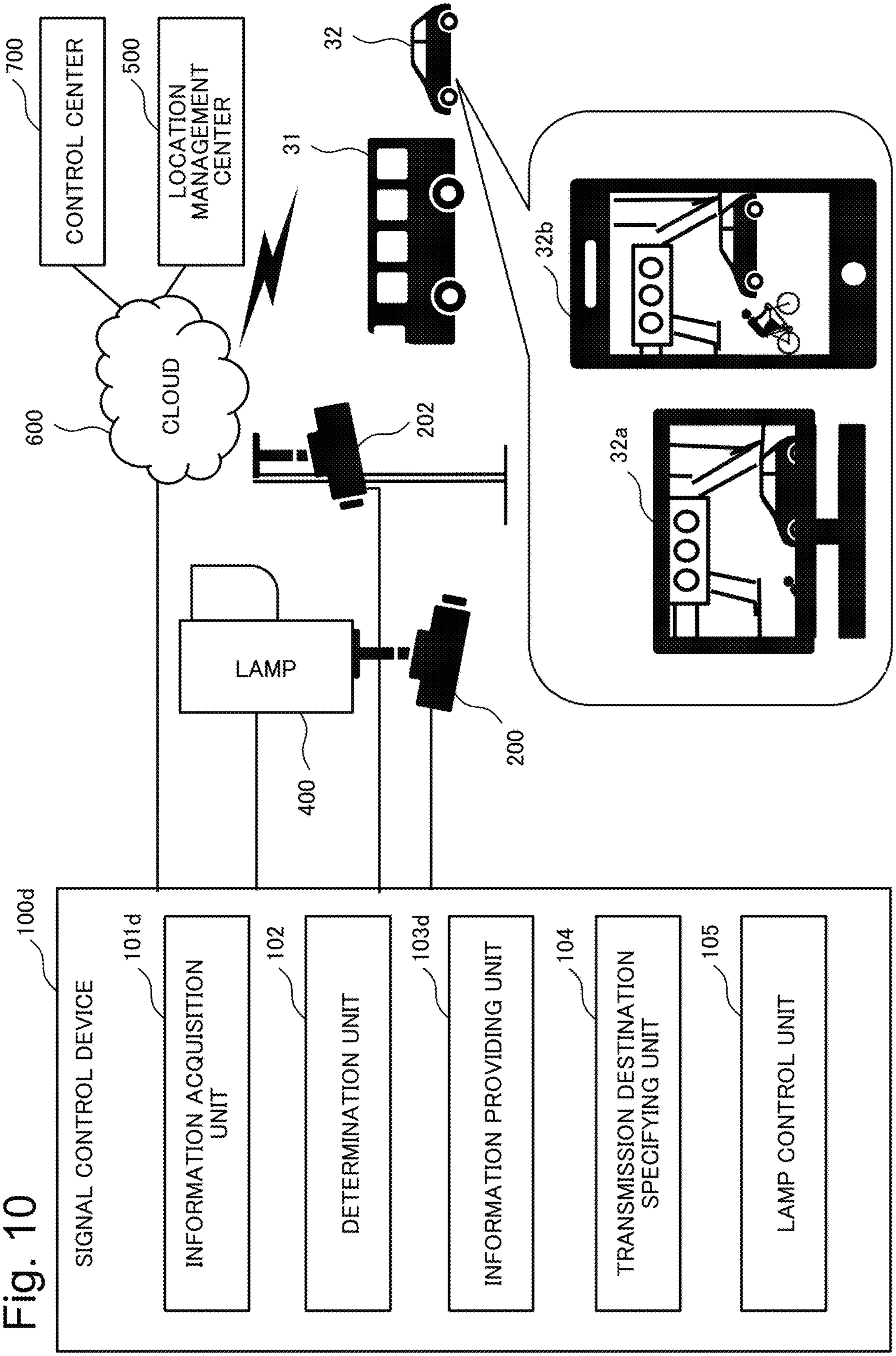
FIG. 10 is a diagram for explaining another operation of a signal control device according to a fourth example embodiment of the present disclosure.

Next, a fourth example embodiment in which information to be transmitted as signal information is changed from the third example embodiment will be described in detail with reference to the drawings. FIG. 10 is a diagram illustrating a configuration of a signal control device according to the fourth example embodiment of the present disclosure. Differences from the third example embodiment illustrated in FIG. 7 are that a signal control device 100*d* is connected to a camera 202 in addition to the camera 200, and that an information providing unit 103*d* of the signal control device 100*d* is changed. Since the other configurations are basically similar to those of the first example embodiment, differences thereof will be mainly described below.

The camera 202 is directed in a direction opposite to that of the camera 200 (traveling direction of the following vehicle), and is installed so as to be able to photograph the display surface of the lamp 400 of the traffic signal. The camera 202 is directed in a direction opposite to that of the camera 200 to be able to capture a situation in the intersection in addition to the display status of the lamp 400.

The information providing unit 103*d* transmits the captured image of the camera 202 acquired by an information acquisition unit 101*d* as signal information to the in-vehicle terminal 32*a* of the following vehicle and the mobile terminal 32*b* of the driver.

Since the operation of the present example embodiment is similar to that of the third example embodiment, the description thereof will be omitted. According to the present example embodiment, it is possible to transmit the situation in the intersection in addition to the display status of the lamp 400 of the traffic signal to the following vehicle 32 which cannot visually recognize the display status of the lamp 400 due to the presence of the preceding vehicle. Specifically, for example, as illustrated in the display screen of the in-vehicle terminal 32*a* or the mobile terminal 32*b* of FIG. 10, the signal control device 100*d* can notify the driver of the following vehicle 32 of the presence of a vehicle or a bicycle moving in the intersection. As a result, even when the yellow light is extended, the driver of the following vehicle 32 can determine whether to enter the intersection after confirming the presence of a vehicle or a bicycle that has not crossed the intersection.

In the above-described example embodiment, it has been described that the camera 202 is arranged at a position where not only the display status of the lamp 400 but also the situation in the intersection can be captured, but there is a case where the display status of the lamp 400 cannot be captured depending on the position of the camera 202. In that case, similarly to the third example embodiment, it is also possible to adopt a configuration in which signal information indicating the display status of the lamp 400 is separately transmitted from the signal control device 100*d* to the in-vehicle terminal 32*a* and the mobile terminal 32*b*.

Although the example embodiments of the present disclosure have been described above, the present disclosure is not limited to the above-described example embodiments, and further modifications, substitutions, and adjustments can be made without departing from the basic technical idea of the present disclosure. For example, the network configuration, the configuration of each element, and the expression form of data and the like illustrated in the drawings are examples for assisting the understanding of the present disclosure, and are not limited to the configurations illustrated in the drawings.

For example, in the third and fourth example embodiments described above, it has been described that the signal control devices 100*b* and 100*d* function as signal information providing devices, but a configuration in which the signal information providing device and the signal control device are provided independently of each other can also be adopted.

In the example embodiment described above, the signal control devices 100 to 100*d* have been described to detect a large vehicle on the basis of an image captured by the camera 200. However, a configuration in which a discriminator for discriminating vehicle types created in advance is used to detect a large vehicle can also be adopted. Such a discriminator for discriminating vehicle types can create, in advance, training data in which training labels are assigned to images captured by the camera 200 and vehicle types of vehicles shown in these images by machine learning using a desired algorithm.

In the above-described example embodiment, an example in which a camera is used as a sensor capable of detecting a vehicle present in a display direction of a lamp has been described, but the sensor is not limited to the camera. For example, a sensor for automatic driving called LiDAR (Light Detection and Ranging, Laser Imaging Detection and Ranging) can be used instead of the camera. For example, a distance image using a time of flight (TOF) sensor can be used as the sensor data.

In the above-described example embodiment, the display status of the lamp 400 has been described as being displayed on the in-vehicle terminal 32*a* or the like, but the output form of the display status of the lamp 400 is not limited to display on a display or the like. For example, it is also possible to adopt a form in which the display status of the lamp 400 is output by voice from a speaker provided in the in-vehicle terminal 32*a* or the mobile terminal 32*b*. In this case, the in-vehicle terminal 32*a* or the mobile terminal 32*b* says "The signal is currently green. It turns yellow in the remaining 5 seconds." and the like.

Figure 11:
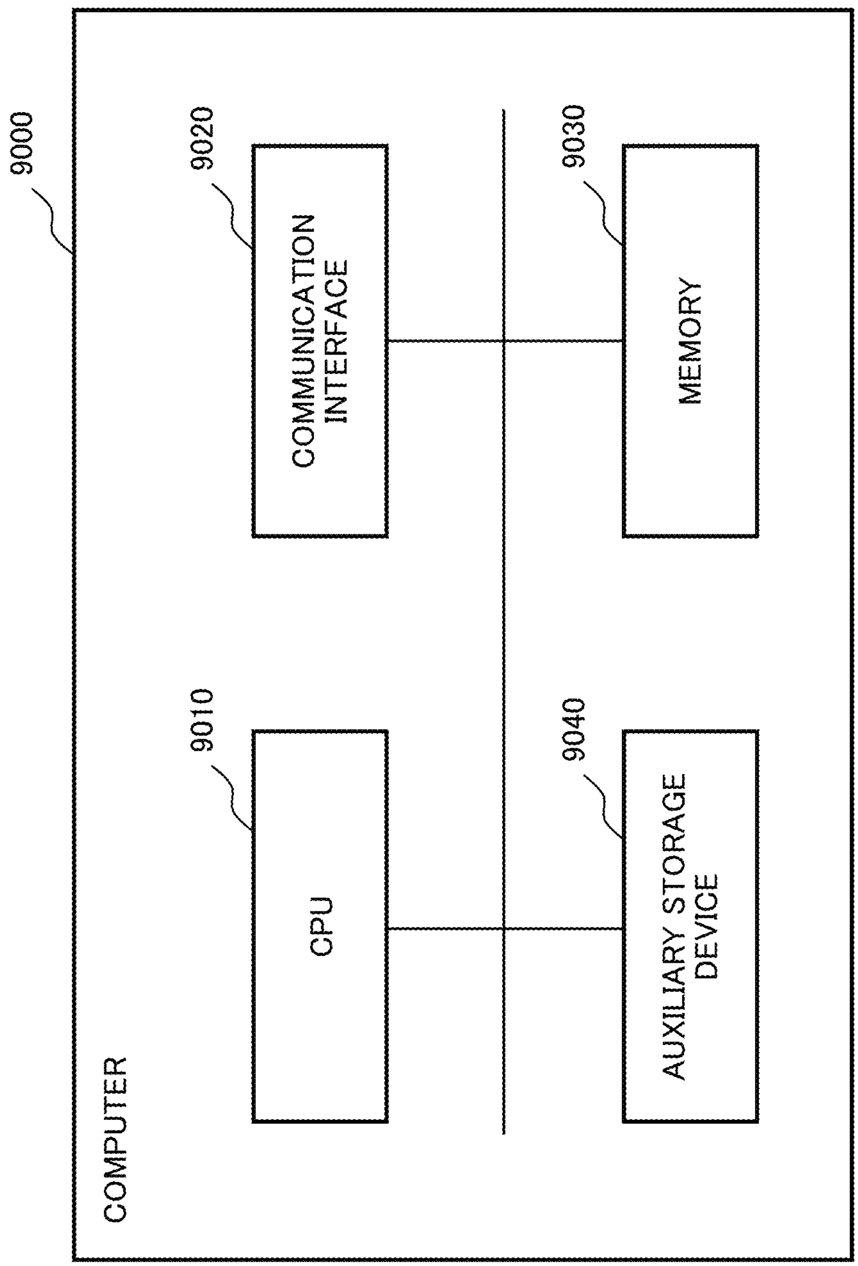
FIG. 11 is a diagram illustrating a configuration of a computer constituting the signal control device of the present disclosure.

The procedure described in each of the above example embodiments can be achieved by a program for causing a computer (9000 in FIG. 11) functioning as a signal control device or a signal information providing device to achieve functions as these devices. Such a computer is exemplified in a configuration including a central processing unit (CPU) 9010, a communication interface 9020, a memory 9030, and an auxiliary storage device 9040 in FIG. 11. That is, the vehicle type determination program and the lamp control program may be executed by the CPU 9010 of FIG. 9.

That is, each unit (processing means and function) of the signal control device or the signal information providing device described above can be achieved by a computer program that causes a processor mounted on these devices to execute each processing described above using its hardware.

Finally, preferred forms of the present disclosure are summarized.

[First Aspect]

(See the Signal Control Device from the First Viewpoint)

[Second Aspect]

In the signal control device, it is possible to adopt a configuration in which the sensor is installed in the vicinity of the lamp in such a way as to be capable of capturing an image of the lamp in a display direction.

[Third Aspect]

In the signal control device, it is possible to adopt a configuration in which the information acquisition unit is configured to be capable of acquiring second sensor data from a second sensor disposed at a position where presence or absence of the following vehicle can be detected from a side, and the determination unit is configured to determine whether there is a following vehicle behind the vehicle captured by the sensor, the following vehicle being incapable of visually recognizing a display status of the lamp due to presence of a preceding vehicle, based on the first sensor data and the second sensor data.

[Fourth Aspect]

In the signal control device, it is possible to adopt a configuration in which the lamp control unit is configured to change a display pattern of the lamp when a display color of the lamp turns red after a predetermined time elapses.

[Fifth Aspect]

In the signal control device, it is possible to adopt a configuration in which when the determination unit detects presence of a vehicle having a vehicle height exceeding a predetermined height, the determination unit determines that there is a following vehicle that is incapable of visually recognizing a display status of the lamp due to presence of a preceding vehicle.

[Sixth Aspect]

In the signal control device, it is possible to adopt a configuration in which the determination unit is configured to determine that there is a following vehicle that is incapable of visually recognizing a display status of the lamp due to presence of a preceding vehicle based on a vehicle type discriminated using a discriminator created in advance.

[Seventh Aspect]

In the signal control device, it is possible to adopt a configuration further including:

an information providing unit configured to be capable of transmitting, to the following vehicle, signal information for notifying a display status of the lamp when it is determined that there is a following vehicle that is incapable of visually recognizing a display status of the lamp.

[Eighth Aspect]

In the signal control device, it is also possible to adopt a configuration in which the lamp control unit inquires of a predetermined control center whether the display time of the lamp may be extended, and changes the display pattern of the lamp when permission is given from the predetermined control center.

[Ninth Aspect]

(See the Signal Control Method from the Second Viewpoint)

[Tenth Aspect]

(See the Computer Program from the Third Viewpoint)

Similarly to the first aspect, the ninth to tenth aspects can be developed into the second to eighth aspects.

The disclosure of the above patent literature is incorporated herein by reference. Within the frame of the entire disclosure (including claims) of the present disclosure, it is possible to change and adjust the example embodiments or examples further on the basis of the basic technical idea. Various combinations or selections (including partial deletions) of various disclosure elements (each element of each claim, each element of each example embodiment or example, each element of each drawing, and the like are included) can be made within the frame of the disclosure of the present disclosure. That is, it is a matter of course that the present disclosure includes various modifications and corrections that can be made by those of ordinary skill in the art in accordance with the entire disclosure including the claims and the technical idea. In particular, for numerical ranges set forth herein, any numerical value or sub-range included within the range should be construed as being specifically described, even if not stated otherwise.

REFERENCE SIGNS LIST

10, 100, 100*a*, 100*b* signal control device
11, 101, 101*a* information acquisition unit
12, 102, 102*a* determination unit
15, 105 lamp control unit
20 sensor
31, 32 vehicle
32*a* in-vehicle terminal
32*b* mobile terminal
40, 400 lamp
103, 103*d* information providing unit
104 transmission destination specifying unit
200, 201, 202 camera
400 lamp
401 pedestrian signal
500 location management center
600 cloud (infrastructure)
700 control center
9000 computer
9010 CPU
9020 communication interface
9030 memory
9040 auxiliary storage device

What is claimed is:

1. A signal control device comprising:
a memory storing instructions; and
one or more processors configured to execute the instructions to:
acquire first sensor data from a sensor configured to detect a vehicle present in a display direction of a lamp;
determine, based on the first sensor data, whether there is a following vehicle behind the vehicle captured by the sensor, the following vehicle being incapable of visually recognizing a display status of the lamp due to presence of a preceding vehicle;
acquire information indicating whether the road is congested in a traveling direction of the following vehicle from the first sensor data, when it is determined that there is a following vehicle that is incapable of visually recognizing a display status of the lamp; and
change a display pattern of the lamp in such a way that the following vehicle can pass through an intersection according to the information.

2. The signal control device according to claim 1, wherein the sensor is installed in a vicinity of the lamp in such a way as to be configured to capture an image of the lamp in a display direction.

3. The signal control device according to claim 1, wherein the one or more processors are further configured to execute the instructions to:
acquire second sensor data from a second sensor disposed at a position where presence of the following vehicle can be detected from a side, and
determine whether there is a following vehicle behind the vehicle captured by the sensor, the following vehicle being incapable of visually recognizing a display status of the lamp due to presence of a preceding vehicle, based on the first sensor data and the second sensor data.

4. The signal control device according to claim 1, wherein the one or more processors are further configured to execute the instructions to:
change a display pattern of the lamp when a display color of the lamp turns red after a predetermined time elapses.

5. The signal control device according to claim 1, wherein the one or more processors are further configured to execute the instructions to:
when detecting presence of a vehicle having a vehicle height exceeding a predetermined height, determine that there is a following vehicle that is incapable of visually recognizing a display status of the lamp due to presence of a preceding vehicle.

6. The signal control device according to claim 1, wherein the one or more processors are further configured to execute the instructions to:
determine that there is a following vehicle that is incapable of visually recognizing a display status of the lamp due to presence of a preceding vehicle based on a vehicle type discriminated using a discriminator created in advance.

7. The signal control device according to claim 1, wherein the one or more processors are further configured to execute the instructions to:
transmit, to the following vehicle, signal information for notifying a display status of the lamp when it is determined that there is a following vehicle that is incapable of visually recognizing a display status of the lamp.

8. The signal control device according to claim 1, wherein the one or more processors are further configured to execute the instructions to:
inquire of a predetermined control center whether a display time of the lamp may be extended; and
change the display pattern of the lamp when permission is given from the predetermined control center.

9. A signal control method comprising:
acquiring first sensor data from a sensor configured to detect a vehicle present in a display direction of a lamp;
determining, based on the first sensor data, whether there is a following vehicle behind the vehicle captured by the sensor, the following vehicle being incapable of visually recognizing a display status of the lamp due to presence of a preceding vehicle;
acquire information indicating whether the road is congested in a traveling direction of the following vehicle from the first sensor data, when it is determined that there is a following vehicle that is incapable of visually recognizing a display status of the lamp; and
changing a display pattern of the lamp in such a way that the following vehicle can pass through an intersection according to the information.

10. A non-transitory recording medium having a program recorded thereon, the program causing a computer connected to a sensor to execute processing of:
acquiring first sensor data from the sensor configured to detect a vehicle present in a display direction of a lamp;
determining, based on the first sensor data, whether there is a following vehicle behind the vehicle captured by the sensor, the following vehicle being incapable of visually recognizing a display status of the lamp due to presence of a preceding vehicle;
acquire information indicating whether the road is congested in a traveling direction of the following vehicle from the first sensor data, when it is determined that there is a following vehicle that is incapable of visually recognizing a display status of the lamp; and
changing a display pattern of the lamp in such a way that the following vehicle can pass through an intersection according to the information.

* * * * *